(12) United States Patent
Born (10) Patent No.: US 8,522,934 B2
(45) Date of Patent: Sep. 3, 2013

(54) LOCKABLE PISTON-CYLINDER UNIT

(75) Inventor: Frank Born, Dienethal (DE)

(73) Assignee: Stabilus GmbH, Koblenz (DE)

( * ) Notice: Subject to any disclaimer, the term of this patent is extended or adjusted under 35 U.S.C. 154(b) by 730 days.

(21) Appl. No.: 12/407,174

(22) Filed: Mar. 19, 2009

(65) Prior Publication Data

US 2009/0236781 A1    Sep. 24, 2009

(30) Foreign Application Priority Data

Mar. 20, 2008    (DE) .......................... 10 2008 015 320

(51) Int. Cl.
  *F16F 9/32*    (2006.01)
(52) U.S. Cl.
  USPC ...................... 188/300; 188/265; 188/322.19
(58) Field of Classification Search
  USPC ................... 188/300, 322.19, 314, 315, 265; 267/64.12, 64.26
  See application file for complete search history.

(56) References Cited

U.S. PATENT DOCUMENTS

| | | | |
|---|---|---|---|
| 3,760,911 A  * | 9/1973 | Porter et al. .................. | 188/300 |
| 5,133,245 A | 7/1992 | Lee et al. | |
| 6,273,405 B2 * | 8/2001 | Okamoto ................... | 267/64.12 |
| 2007/0187198 A1 | 8/2007 | Born et al. | |

FOREIGN PATENT DOCUMENTS

| | | |
|---|---|---|
| FR | 2 719 641 A1 | 11/1995 |
| JP | 1-128038 U | 8/1989 |
| JP | 6-81034 U | 12/1994 |
| JP | 2007-24145 | 2/2007 |

* cited by examiner

*Primary Examiner* — Pamela Rodriguez
(74) *Attorney, Agent, or Firm* — Cozen O'Connor (57) ABSTRACT

A lockable piston-cylinder unit includes a cylinder having at least one axially facing counterstop; a piston dividing the cylinder into a first working chamber and a second working chamber; a piston rod extending through the first working chamber to a free end outside the cylinder; and a fastening tube having a first end in which the free end of the piston rod is fixed, a second end which receives the cylinder coaxially, and at least one axially facing supporting stop. When the piston rod is extended to maximum extension, the fastening tube is rotatable relative to the cylinder from a release position, wherein the supporting stop is offset from a respective counterstop, to a locking position, wherein the supporting stop faces the counterstop so that the fastening tube cannot move axially relative to the cylinder.

20 Claims, 15 Drawing Sheets

LOCKABLE PISTON-CYLINDER UNIT

BACKGROUND OF THE INVENTION

1. Field of the Invention

The invention is directed to a lockable piston-cylinder unit with a cylinder arrangement having a closed cylinder in which a piston dividing the cylinder interior into a first chamber and a second chamber is guided so as to be displaceable. The piston having a piston rod which is guided out of the cylinder interior so as to be sealed at one front side of the cylinder, the first chamber and second chamber being connected or connectable to one another.

2. Description of the Related Art

A fastening tube enclosing the cylinder arrangement and has a length greater than or equal to the move-out length of the piston rod, and is fixedly by one of its ends at the piston rod in the area of its free end and has a supporting stop. When the piston rod is moved out, the fastening tube can be moved out of its release position into a locking position in which the supporting stop contacts a counterstop of the cylinder arrangement so as to block a moving-in movement of the piston-cylinder unit.

In a gas spring of the type mentioned above, e.g., for opening hatches or doors particularly in motor vehicles, it is known that the fastening tube is mounted by its first end area in the area of the free end of the piston rod so as to be pivotable between a release position coaxial to the piston rod and a locking position which is inclined relative to the longitudinal axis of the piston rod and has the supporting stop at its second end area. When the piston rod is moved out, the fastening tube can be pivoted into the locking position and can contact one front side of the cylinder axially by the supporting stop.

This gas spring has the problem that transverse forces are generated in the system by the pivoting of the fastening tube and can cause the system to buckle when overloaded.

SUMMARY OF THE INVENTION

Therefore, it is an object of the invention to provide a piston-cylinder unit of the type mentioned above in which buckling is prevented, particularly when the piston rod is moved out.

This object is met according to the invention by arranging the cylinder arrangement and the fastening tube coaxial to one another and rotatable relative to one another with respect to their longitudinal axis between the release position and the locking position.

Transverse forces which act on the piston-cylinder unit during the pivoting of the fastening tube and, therefore, also a buckling of the piston rod caused by these transverse forces are prevented in this way.

The fastening tube can have a plurality of supporting stops and the cylinder arrangement can have a corresponding number of counterstops, and the supporting stops and the counterstops can be uniformly distributed around the circumference for a uniformly distributed support.

The counterstops can project outward radially from the cylinder arrangement, and the supporting stops can be formed so as to project radially inward from the inner wall of the fastening tube.

To prevent the cylinder arrangement from rotating relative to the fastening tube when the piston rod is not moved out fully into the locking position, means for blocking rotation can be arranged between the cylinder arrangement and the fastening tube to allow a relative rotation of the cylinder arrangement and fastening tube only when the piston rod is in the completely moved out position.

In a simple construction, the means for blocking rotation can have a rotation-blocking projection of the cylinder arrangement which projects radially outward and which engages displaceably in a longitudinal groove extending parallel to the longitudinal axis at the inner wall of the fastening tube.

Longitudinal grooves into which the supporting stops forming the rotation-blocking projections project can be formed in the inner wall of the fastening tube corresponding to the counterstop(s), wherein supporting stops are formed next to one or more ends of the longitudinal grooves which are closer to the piston rod in circumferential direction.

In another construction, the means for blocking rotation can have a guide projection of the fastening tube which projects inward radially and which engages displaceably in a longitudinal groove extending parallel to the longitudinal axis at the outer surface of the fastening tube or a structural component part enclosing the fastening tube.

An exact rotation until reaching the locking position is achieved by the cylinder arrangement and/or the fastening tube having one or more stops which are contacted by the supporting stops and/or the counterstops during the relative rotation of the cylinder arrangement and fastening tube into the locking position.

A simple arrangement of the counterstops at the cylinder arrangement results when a holding sleeve is arranged at least on the end of the cylinder arrangement on the piston rod side so as to be fixed with respect to rotation relative to it and fixed axially and which has the counterstop or counterstops, wherein the holding sleeve and the counterstops can be formed in one piece, particularly from plastic, so as to economize on parts.

The fastening tube is guided and supported, particularly when the piston rod is moved out, when the holding sleeve is displaceably guided by its radial circumferential outer surface at the inner wall of the fastening tube.

To prevent an unwanted automatic rotation out of the locking position into the release position, the supporting stop has a stop plane extending at an inclination to the longitudinal axis in circumferential direction from an insertion end to a locking end, wherein the locking end defining the locking position is at a greater distance from the end of the cylinder arrangement remote of the piston rod than the insertion end.

This arrangement for preventing rotation is further improved when the counterstop has another stop plane extending at an inclination to the longitudinal axis in circumferential direction from an insertion end to a locking end, wherein the locking end defining the locking position is closer to the end of the cylinder arrangement remote of the piston rod than the insertion end.

The means for preventing buckling when the piston rod is moved out is further improved when a guide sleeve is fixed in the open end area of the fastening tube, the cylinder of the cylinder arrangement being guided in the guide tube so as to be displaceable.

To prevent damage when manual force is applied to the moved out piston rod and when the fastening tube is in the locking position, the stop or stops can be deflected in opposition to a defined spring force from the locking position radially into a run-over position in which the supporting stop or supporting stops are disengaged from the counterstops and the piston rod is movable in the push-in direction. This will automatically cancel locking in the event of overloading in the move-in direction.

In a simple construction, the stop faces of the counterstops facing the supporting stops axially can be constructed as ramps which are inclined relative to the longitudinal axis, and the additional stop faces of the supporting stops which face the counterstops axially can be constructed as ramps which are inclined relative to the longitudinal axis.

For this purpose, the counterstops can serve a dual function so as to economize on parts by arranging them at the free ends of spring arms which extend axially toward the free end of the piston rod. The spring arms are fixed by their other ends at the end area of the cylinder of the cylinder arrangement on the piston rod side.

A compulsory rotation of the fastening tube into its release position is carried out when locking is overcome by a rotation-blocking first longitudinal groove extending parallel to the longitudinal axis and a parallel second longitudinal groove of the same cross section which extends parallel to the rotation-blocking longitudinal groove and in which the rotation-blocking projection projects. The second groove opens into the rotation-blocking first longitudinal groove at the end closer to the free end of the piston rod along a connection area which is inclined in the manner of a ramp toward the first longitudinal groove. The grooves are arranged at the end area of the fastening tube opposite to the end on the piston rod side. The parallel longitudinal groove is connected to the rotation-blocking longitudinal groove at the end of the connection area opposite to that in which the parallel longitudinal grooves open into the rotation-blocking longitudinal grooves.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE PRESENTLY PREFERRED EMBODIMENTS

The piston-cylinder unit shown in the drawings which is formed as a lockable gas spring has a cylinder arrangement 1 with a closed cylinder 2 in which a piston 33 is guided so as to be displaceable and which divides the interior of the cylinder, which is filled with a gas under pressure, into a first chamber and a second chamber.

In a piston-cylinder unit which is not formed as a gas spring, the cylinder interior can also be filled with oil.

A piston rod 3 is arranged at one side of the piston 33. The piston rod 3 is guided out of the cylinder interior at a front end 4 of the cylinder 2 so as to be sealed by a sealing and guiding element 23. The two chambers of the cylinder interior are connected to one another by a choke connection, not shown. The choke connection can be formed as an axial groove in the piston or in the cylinder.

A fastening tube 5 enclosing the cylinder arrangement 1 has a first end area 6 at the free end of the piston rod 3 and a second end area 7 extending toward the cylinder 2. The fastening tube 5 is arranged on the piston rod 3 so as to be rotatable around the longitudinal axis of the piston rod 3 but fixed with respect to displacement axially.

The fastening tube 5 has an axial through-opening 8 in its first end area 6 through which the free end of the piston rod 3 is guided.

A first fastening part 10 is screwed onto the free end of the piston rod 3 provided with a thread 9. The front side of the fastening part 10 facing the fastening tube 5 forms a stop 11 which is supported axially at the outlet area 12 of the through-opening 8. A second fastening part 13 is arranged at the end of the cylinder 2 remote of the piston rod 3. The two fastening parts 10 and 13 are formed as ball sockets.

A guide sleeve 14 is fixedly inserted into the fastening tube 5 in its end area 7. The cylinder 2 of the cylinder arrangement 1 is displaceable in the guide sleeve 14.

Starting from the end closest to the first fastening part 10, six longitudinal grooves 15 extending parallel to the longitudinal axis are formed at the inner wall of the fastening tube 5 and are arranged so as to be uniformly distributed radially at the circumference and extend axially in direction of the other end of the fastening tube 5. The longitudinal grooves 15 are incorporated directly in the fastening tube 5 formed as a plastic injection molded part. The webs 17 separating the longitudinal grooves 15 from one another form supporting stops 18 at their front ends facing the second fastening part 13.

A holding sleeve 19 is mounted on the end 4 of the cylinder 2 facing the first fastening part 10, this holding sleeve 19 having cam-shaped counterstops 20 which project out axially over the end 4 of the cylinder 2 and radially over the diameter of the cylinder 2, its outer diameter corresponding to the inner diameter of the fastening tube 5 in the area of the longitudinal grooves 15.

The counterstops 20 correspond to the longitudinal grooves 15 with respect to distribution and cross-sectional profiles. When the piston rod 3 is moved in, the counterstops 20 are pushed into the longitudinal grooves 15 so that it is impossible for the fastening tube to rotate relative to the cylinder arrangement. When the piston rod 3 is moved out, the counterstops 20 move in the longitudinal grooves 15 until they are moved out of the longitudinal grooves 15 shortly before the end of the maximum moved out position. In this position, the counterstops 20 are in the release position relative to the supporting stops 18. In this release position, it is possible for the counterstops 20 to move into the longitudinal grooves 15 again.

The fastening tube 5 can now be rotated manually around the longitudinal axis relative to the cylinder arrangement 1 until the side of the counterstops 20 directed toward the longitudinal axis in circumferential direction contacts stops 21 of the fastening tube 5. The counterstops 20 are now in the locking position axially relative to the supporting stops 18 and the piston rod 3 can now no longer move in.

In the first embodiment, shown in FIGS. 1 to 6, the stop planes 22 of the supporting stops 18 and of the counterstops 20, which stop planes 22 face one another axially in the locked position, are inclined in circumferential direction relative to the longitudinal axis. With respect to the supporting stops 18 in the fastening tube 5, the locking end is at a greater distance from the end of the cylinder arrangement 1 remote of the piston rod than the insertion end. With respect to the counterstops 20 on the holding sleeve 19, the locking end is closer to the end of the cylinder arrangement 1 remote of the piston side than the insertion end. In this locking position, the piston rod 3 is locked in its moved out position. The piston rod 5 can be moved back into its moved-in position again by rotating the fastening tube 5 back into the release position.

In the second embodiment, shown in FIGS. 7 to 15, a spring arm basket 24 is fastened to the holding sleeve 19 at the end 4 of the cylinder 2 on the piston rod side. The spring arm basket 24 has six spring arms 25 which project freely away from the cylinder 2 axially and are arranged so as to be distributed corresponding to the longitudinal grooves 15.

Guide projections 16 running in the longitudinal grooves 15 are arranged at the cylinder 2 and protect the spring arms from transverse forces. The guide projections 16 are located either in the rotation-blocking longitudinal grooves 29 or in the longitudinal grooves 15.

The free ends of the spring arms 25 are provided with counterstops 20 whose stop faces 26 are formed at an inclination to the longitudinal axis. The stop faces 27 of the supporting stops 18 are also formed at an inclination to the longitudinal axis in a corresponding manner. When the counterstops 20 are in the locking position axially relative to the supporting stops 18, the piston rod 3 is preventing from moving in up to a determined force applied to the piston rod 3 in the moving in direction. When this determined applied force is exceeded, the stop faces 26 and 27 slide one upon the other and bend the spring arms 25 radially inward against their spring force. The piston rod 3 can now be pushed in and the counterstops 20 slide on the webs 17.

In order to guide the counterstops 20 back into the longitudinal grooves 15, rotation-blocking radial projections 28 are arranged on the holding sleeve 19 and project in an axially displaceable manner into corresponding rotation-blocking longitudinal grooves 29 formed in the inner wall of the guide sleeve 14 parallel to the longitudinal axis.

Figure 1:
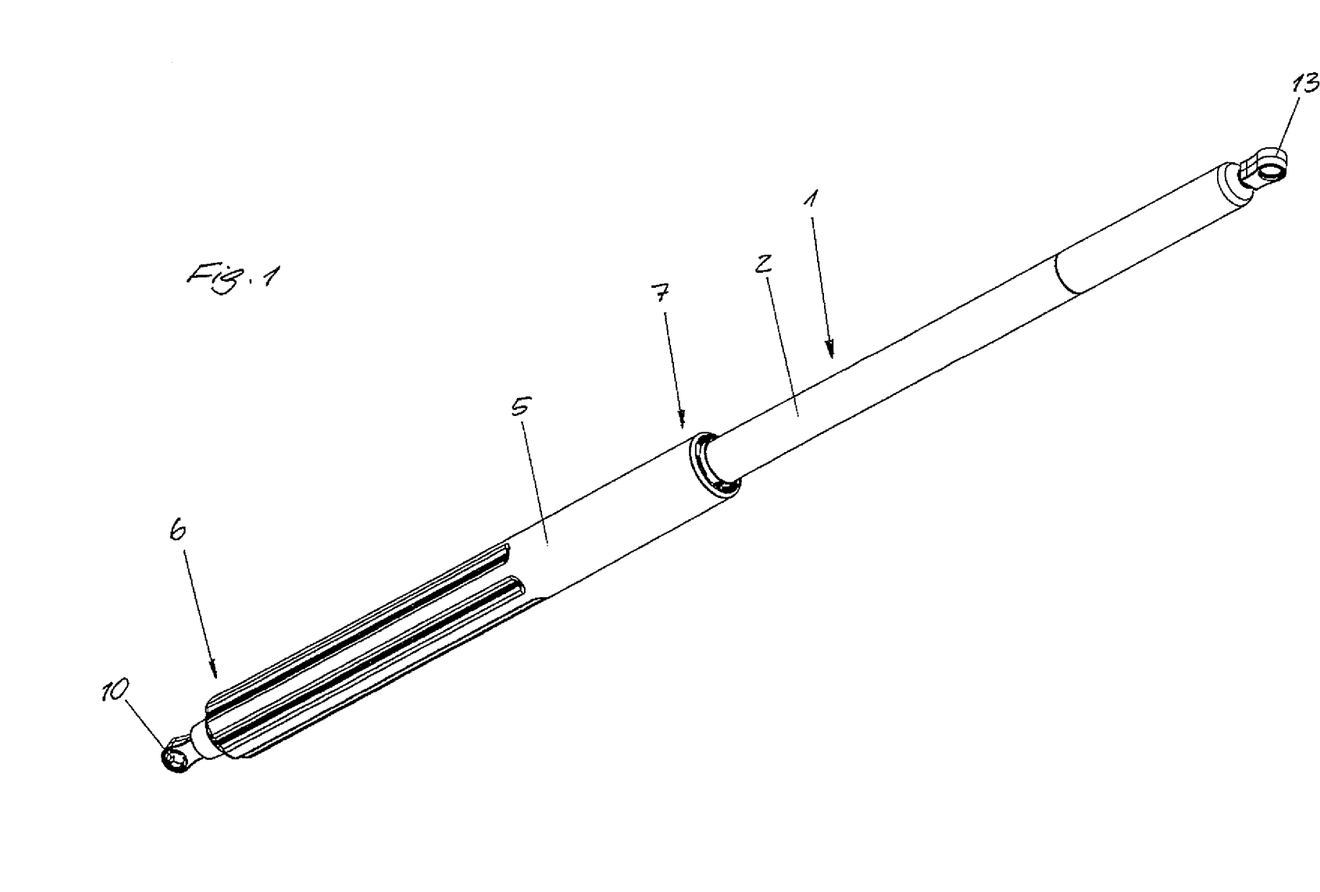
FIG. 1 is a perspective view of a first embodiment of a lockable gas spring according to the invention.
Figure 2:
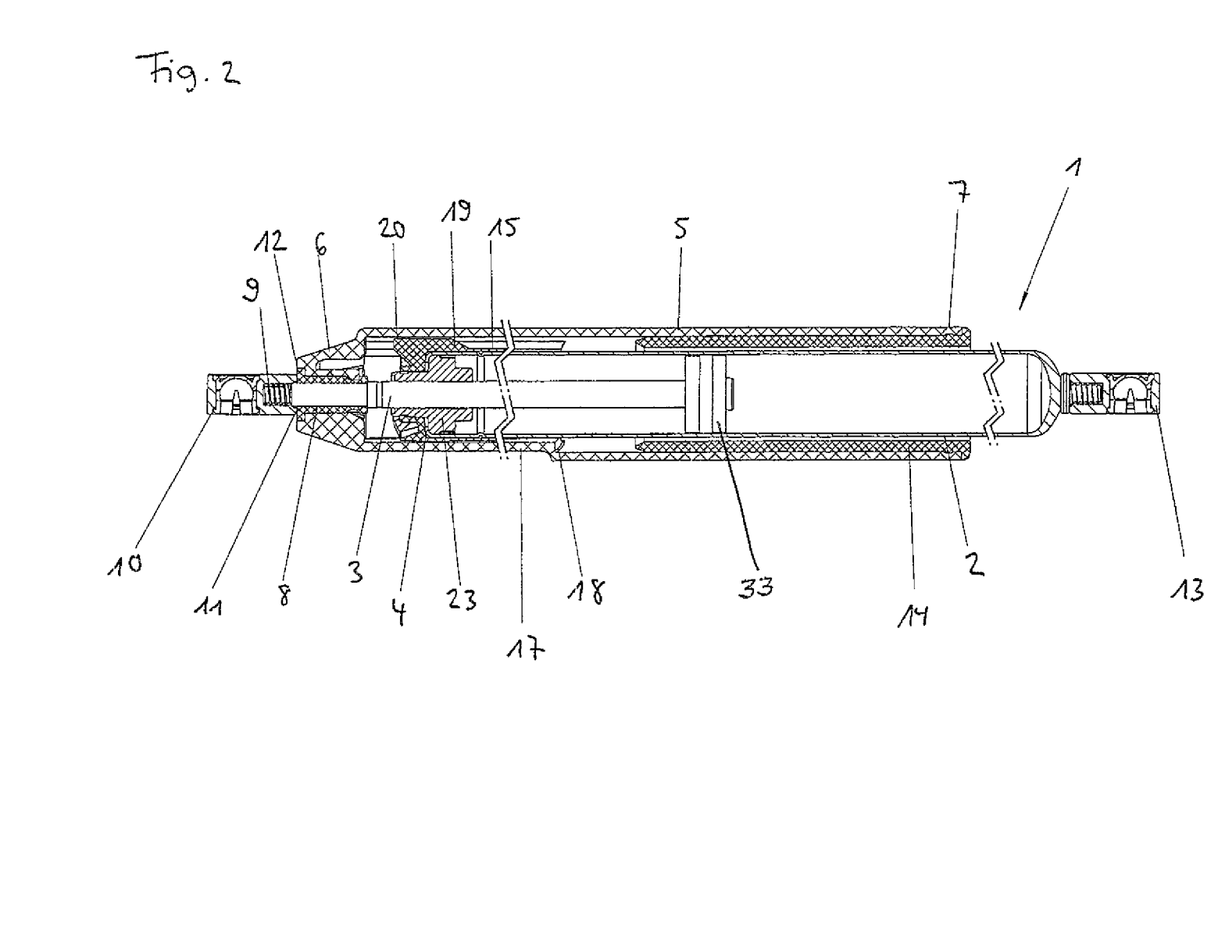
FIG. 2 shows a cross section through the gas spring according to FIG. 1.
Figure 3:
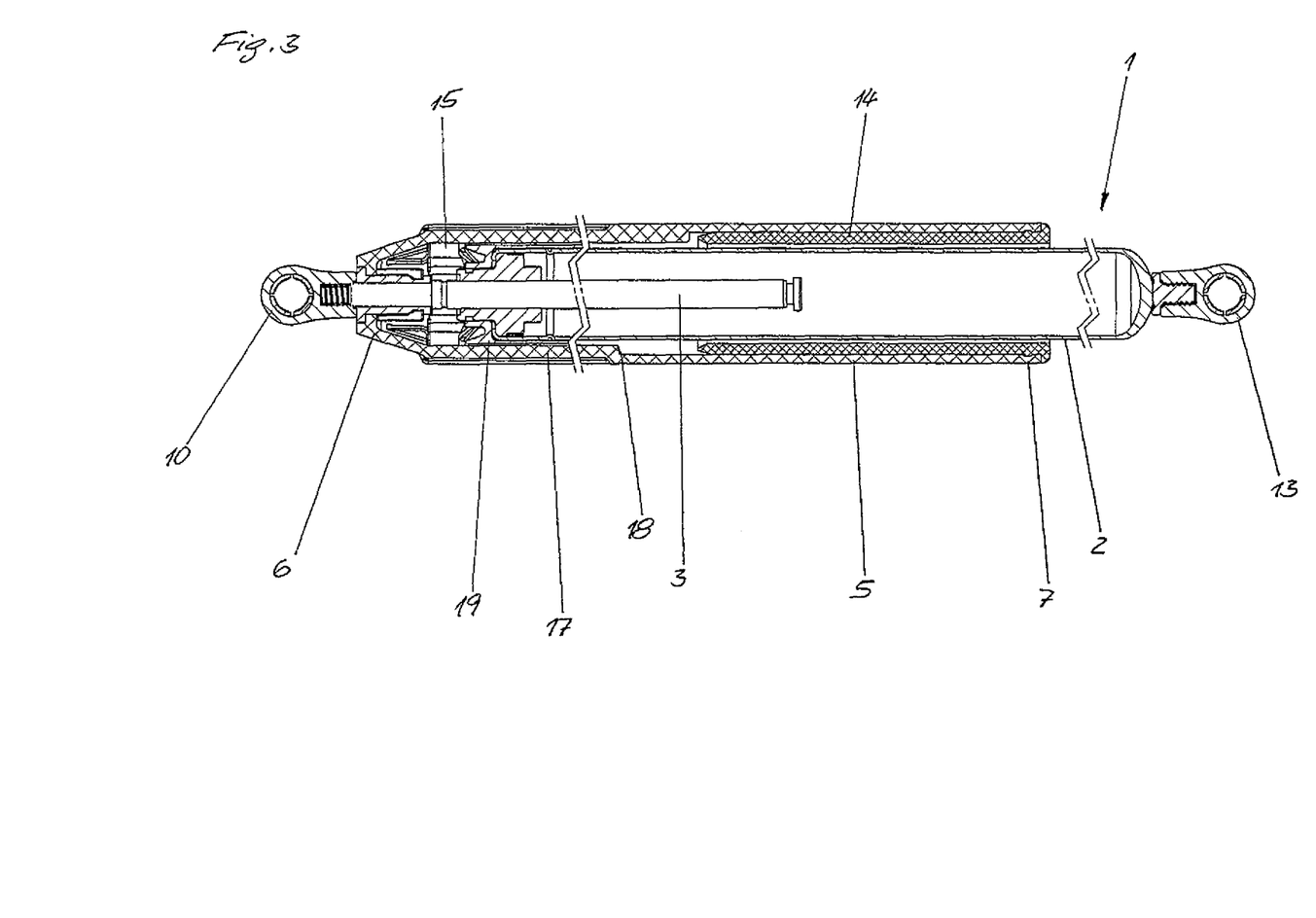
FIG. 3 shows a cross section through the gas spring according to FIG. 1 that is offset by 90° relative to the cross section shown in FIG. 2.
Figure 4:
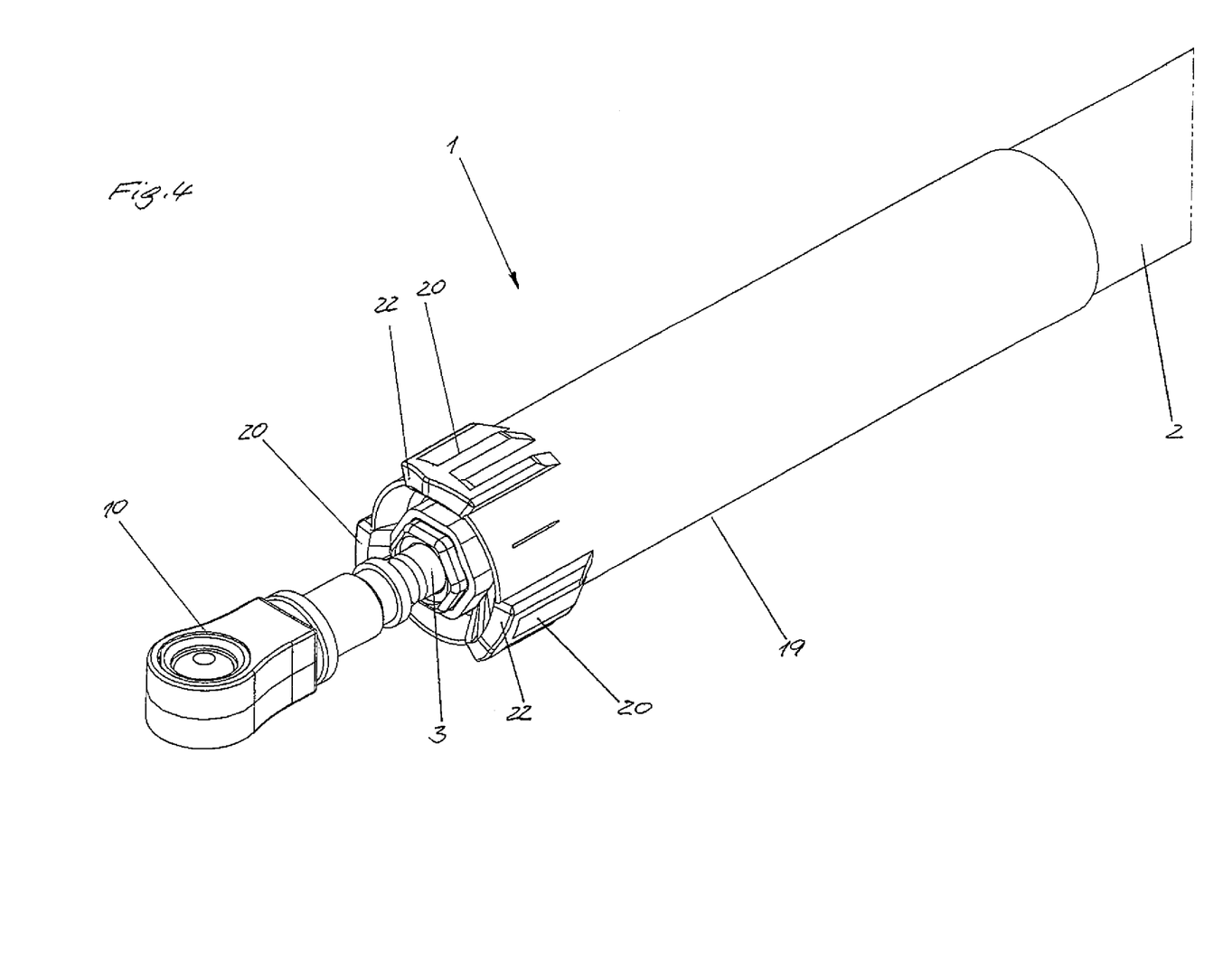
FIG. 4 is a perspective view of the end area of the cylinder arrangement of the gas spring on the piston rod side according to FIG. 1.
Figure 5:
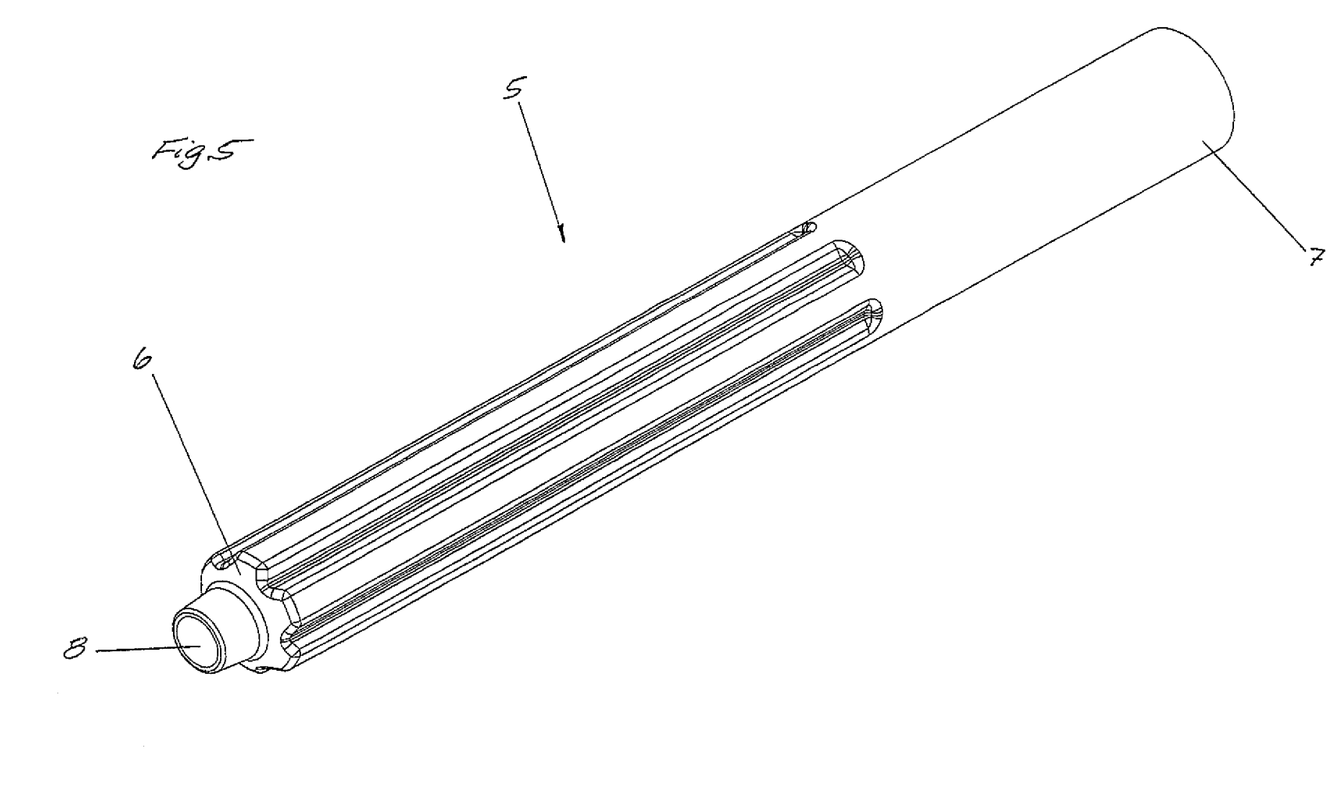
FIG. 5 is a perspective view of the fastening tube of the gas spring according to FIG. 1.
Figure 6:
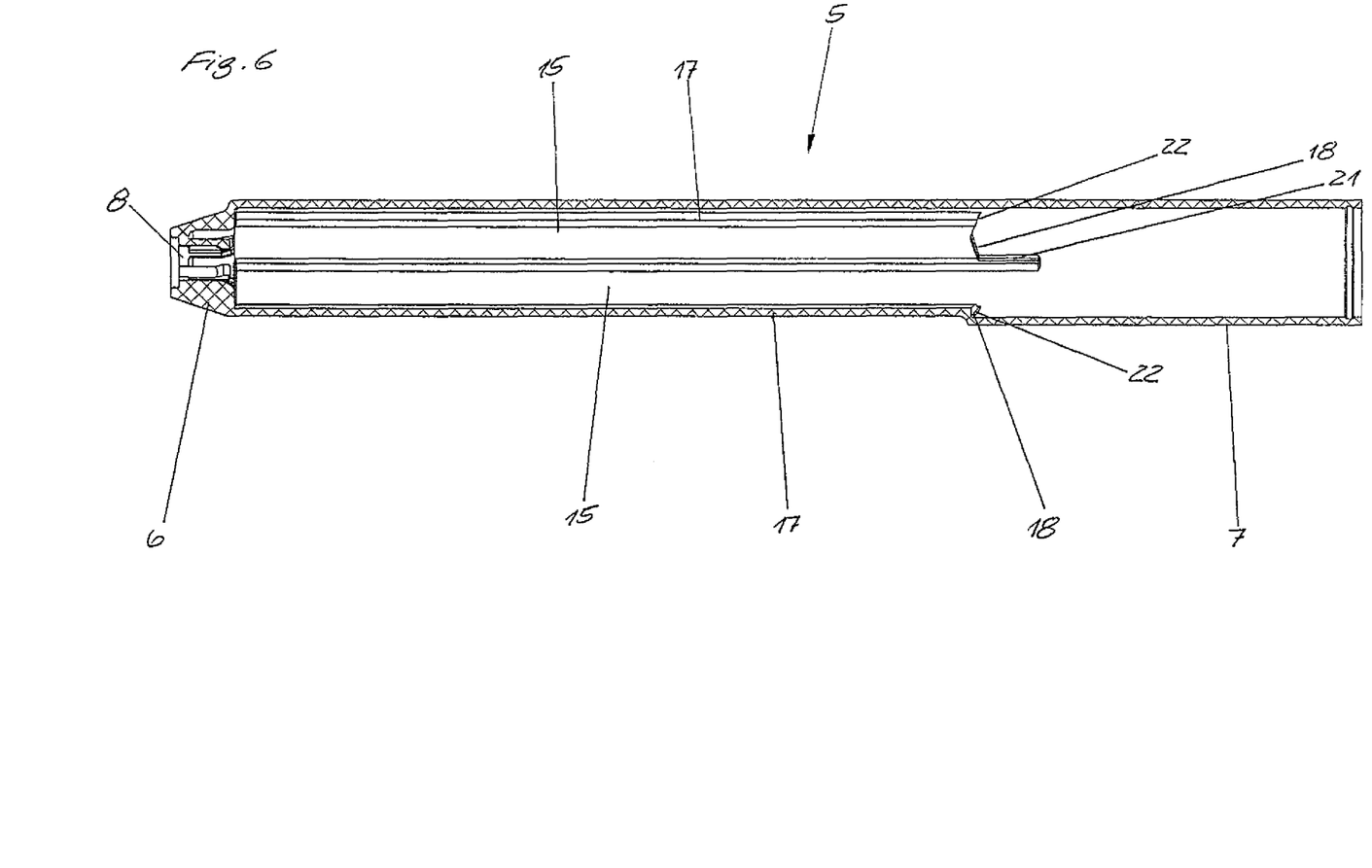
FIG. 6 shows a cross section through the fastening tube according to FIG. 5.
Figure 7:
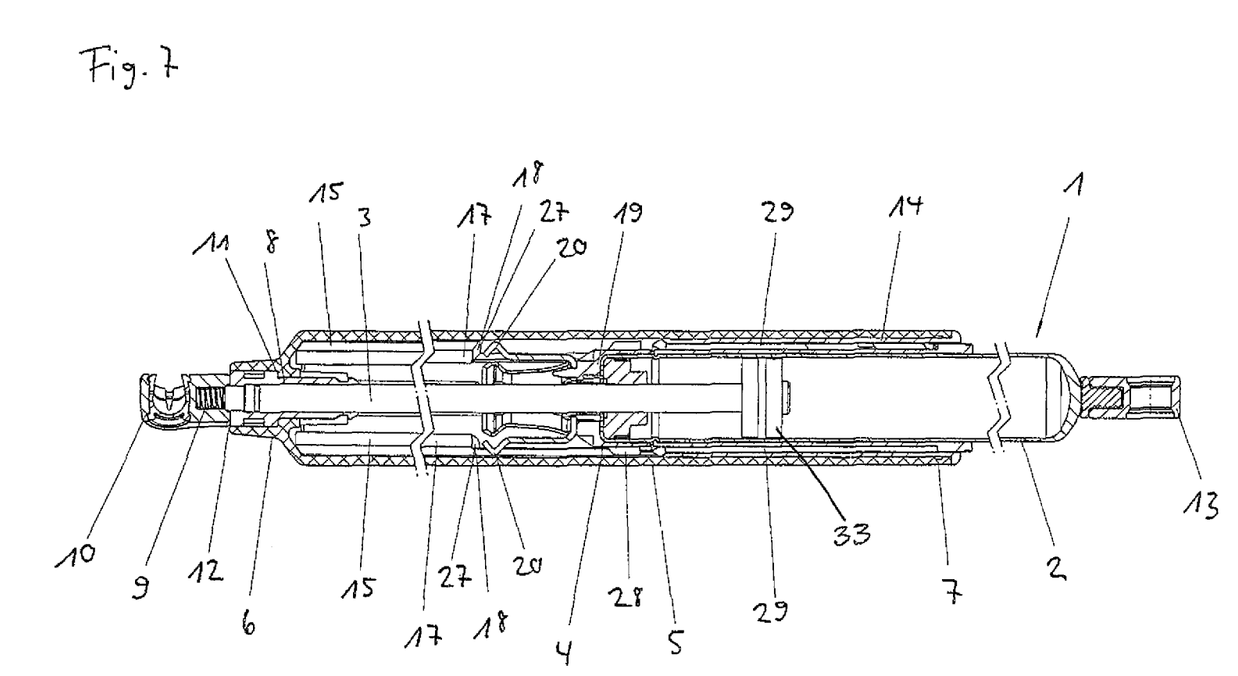
FIG. 7 shows a cross section through a second embodiment example of a gas spring.
Figure 8:
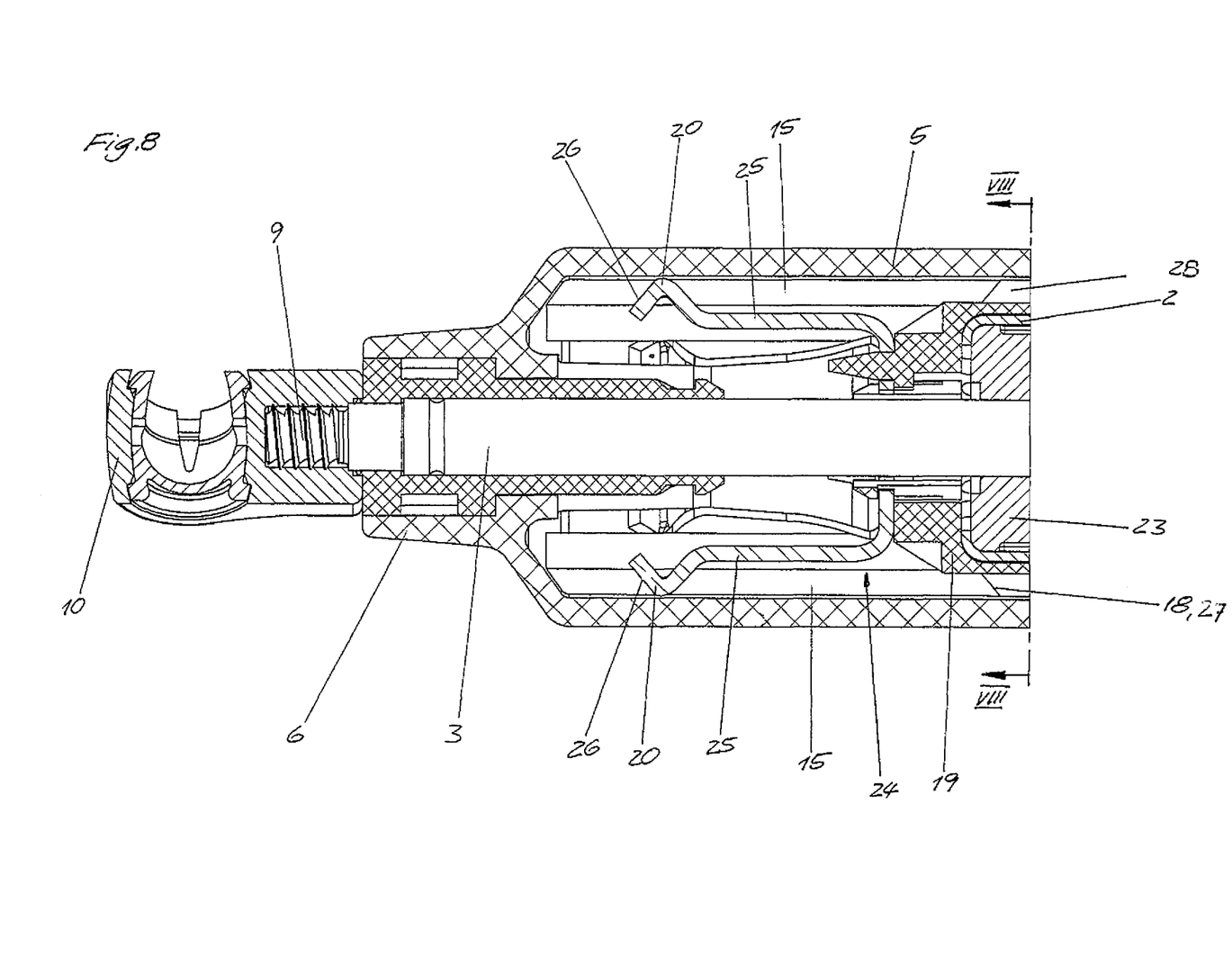
FIG. 8 shows an enlarged view of the end area on the left side of the gas spring according to FIG. 7.
Figure 9:
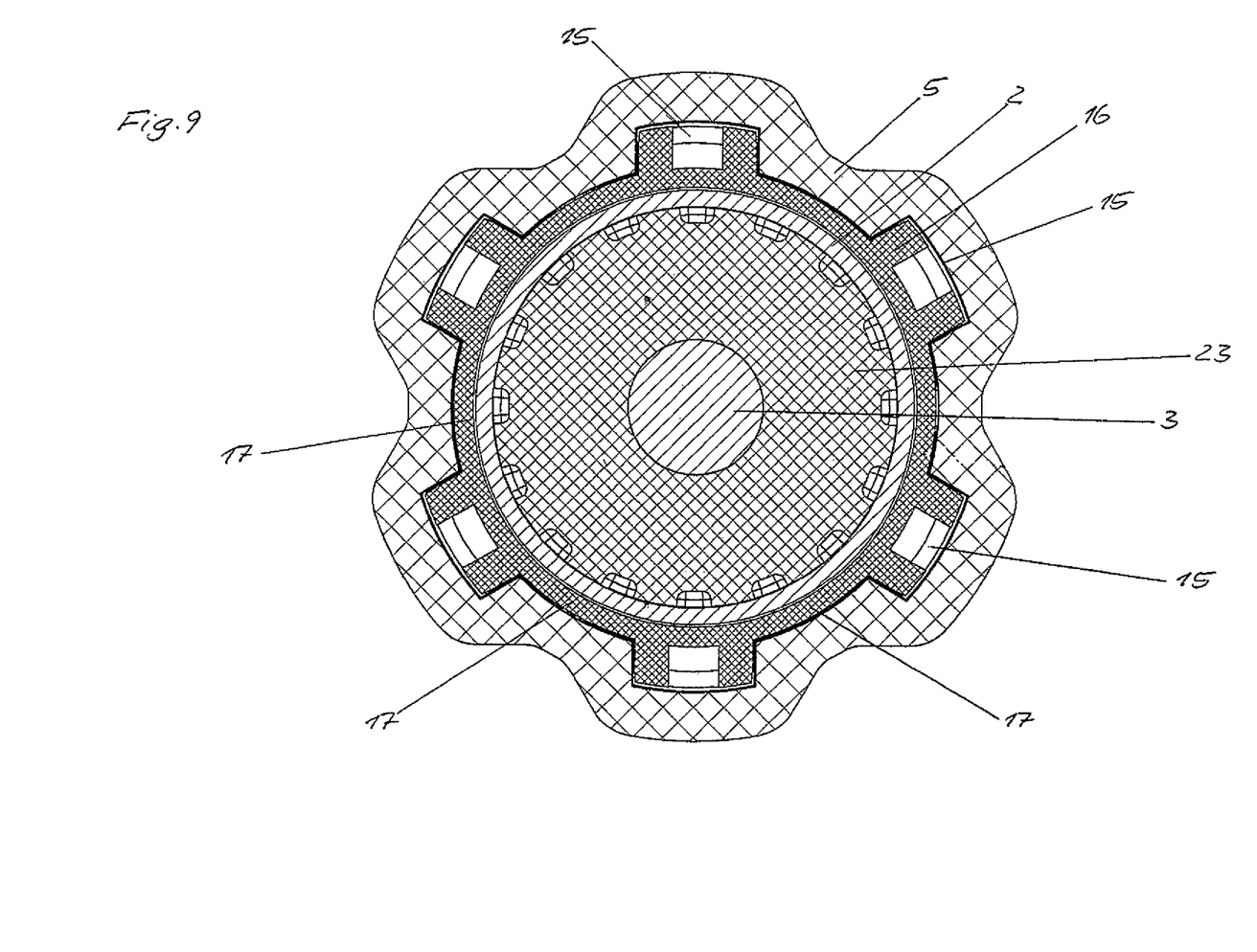
FIG. 9 is a sectional view along line VIII-VIII in FIG. 8.
Figure 10:
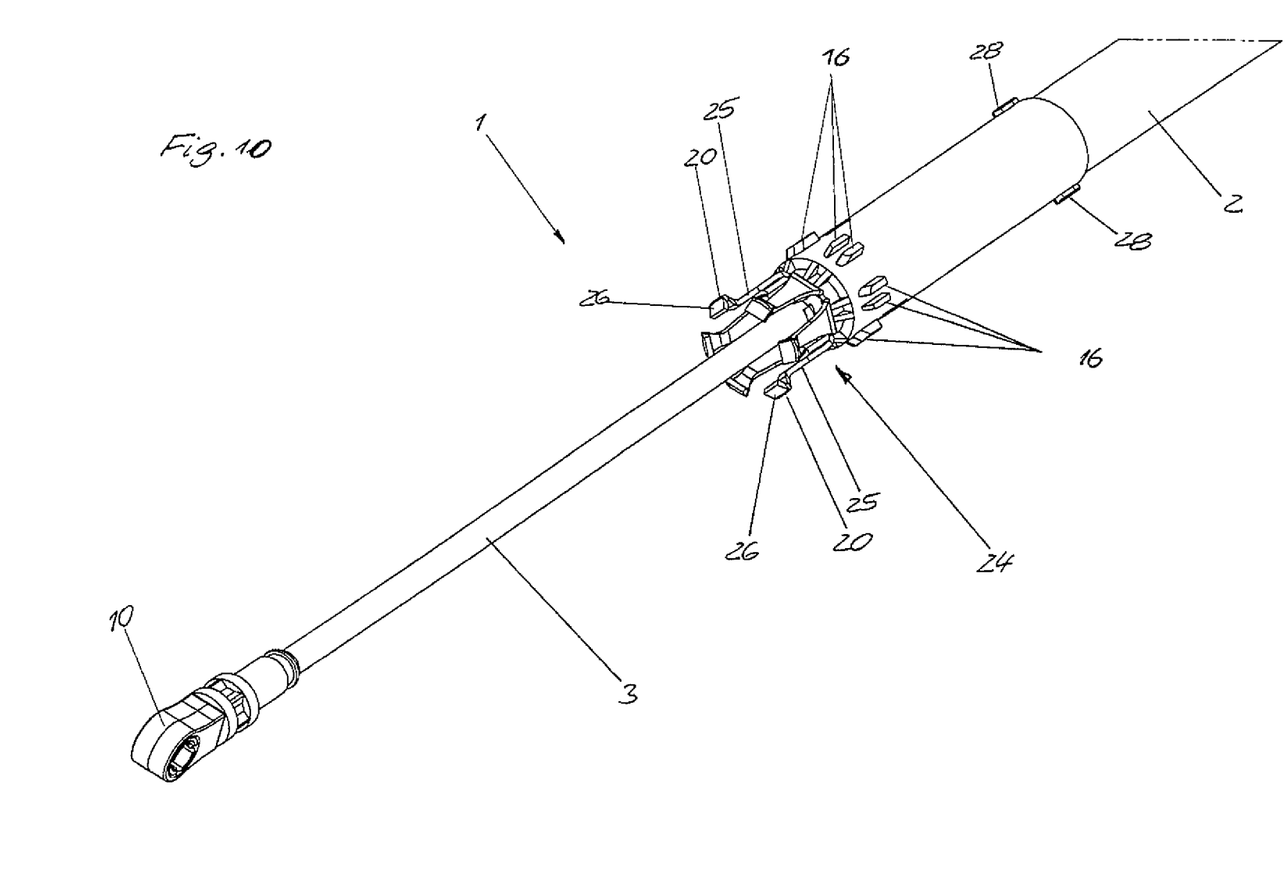
FIG. 10 is a perspective view of the end area of the cylinder arrangement on the piston rod side according to FIG. 7.
Figure 11:
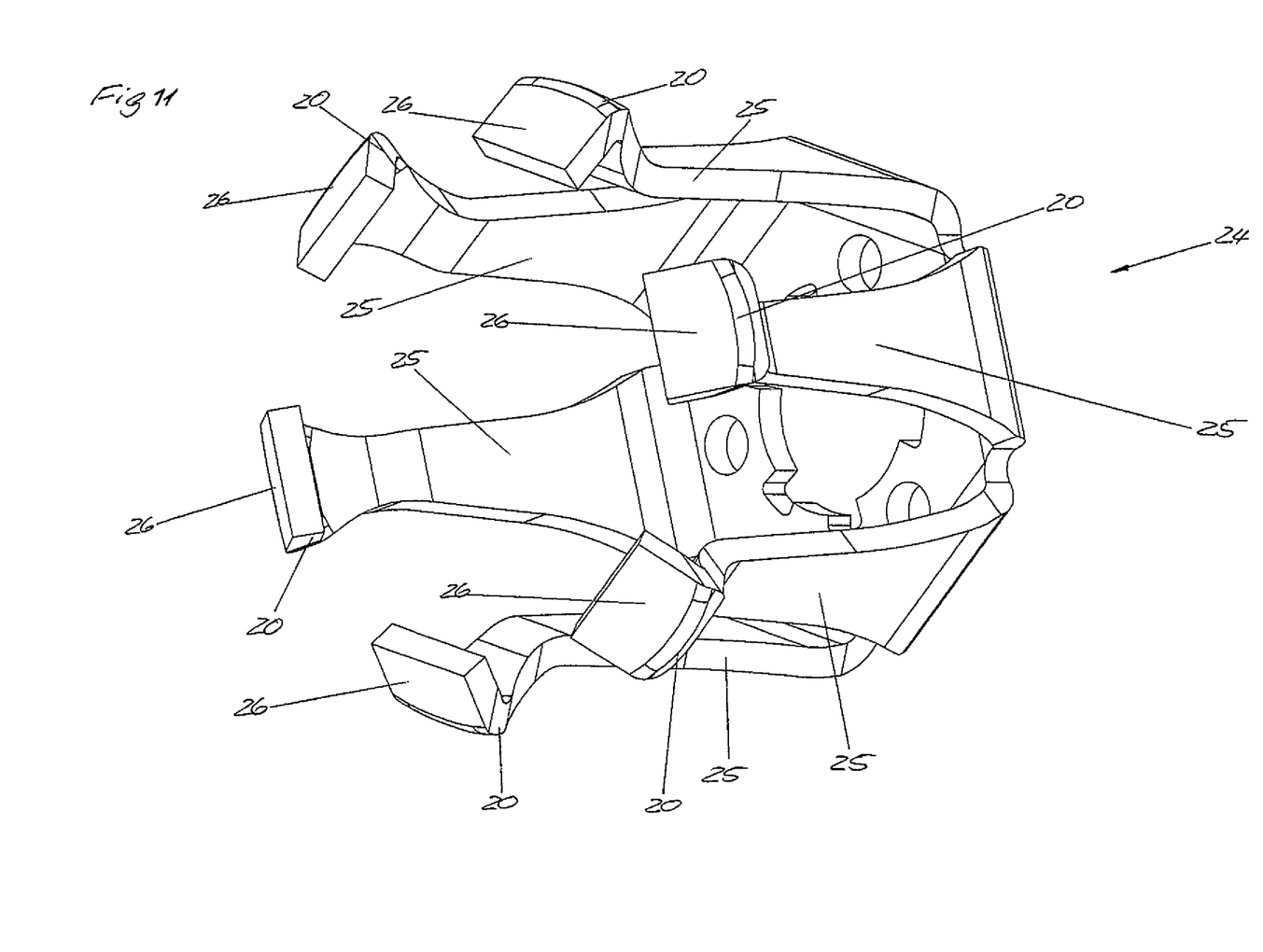
FIG. 11 is an enlarged view of the spring arms of the cylinder arrangement according to FIG. 7.
Figure 12:
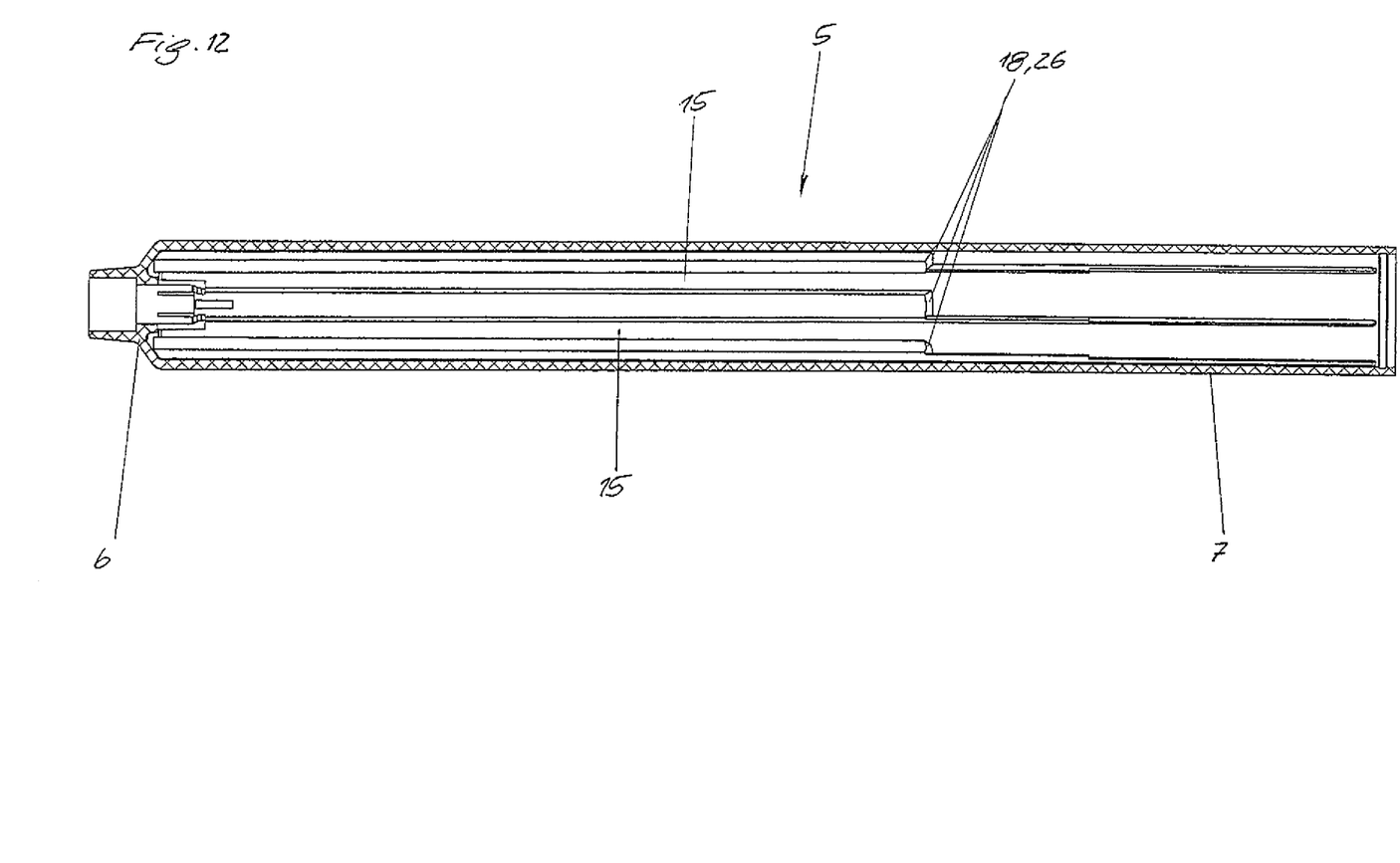
FIG. 12 shows a cross section through the fastening tube of the gas spring according to FIG. 7.
Figure 13:
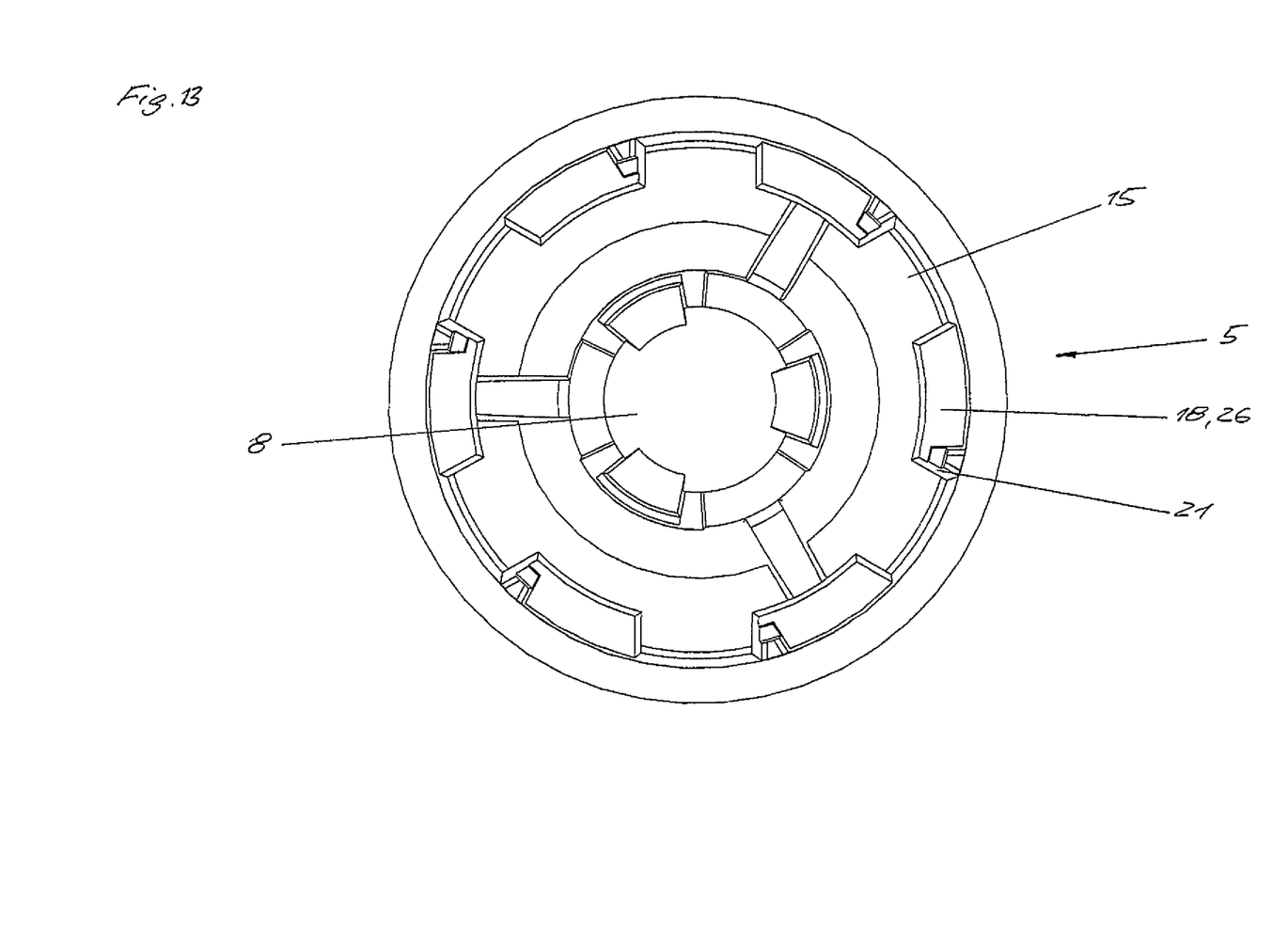
FIG. 13 is a front view of the fastening tube according to FIG. 12.
Figure 14:
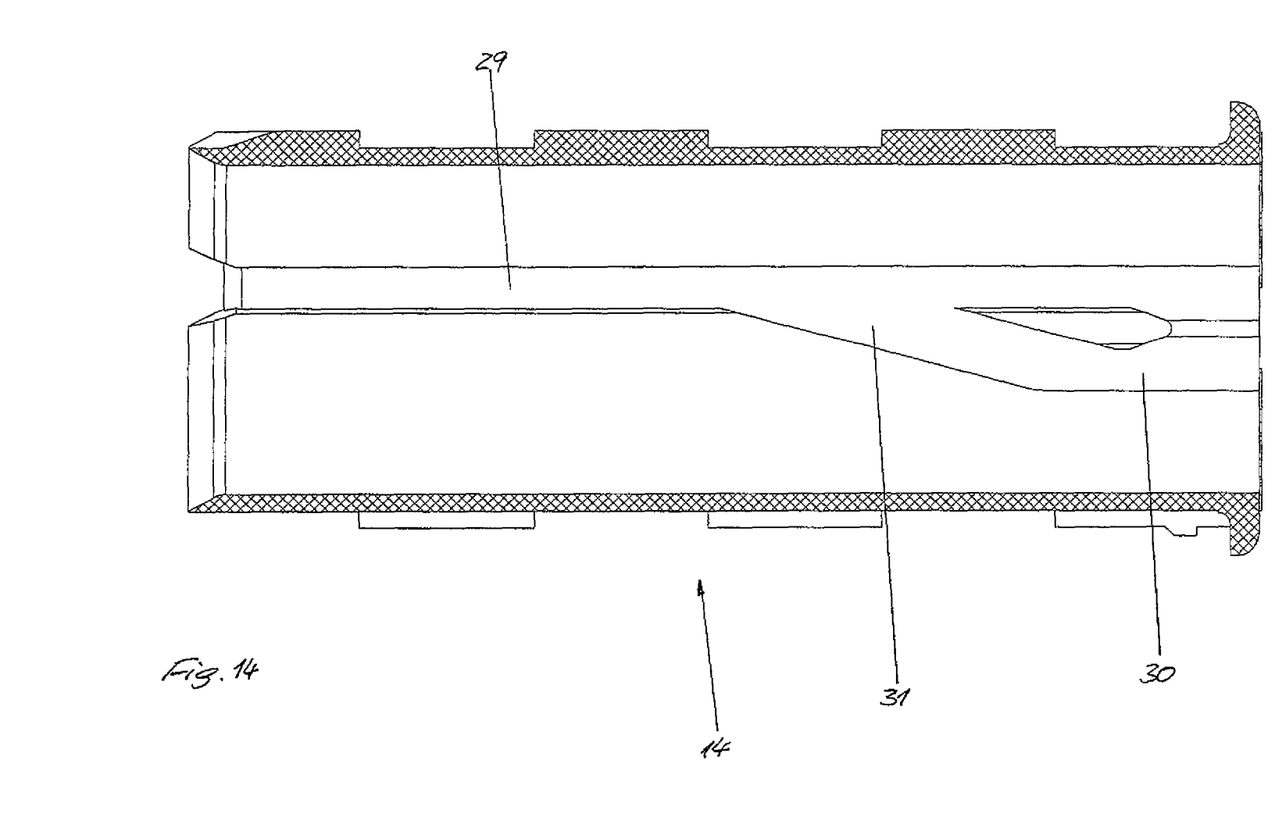
FIG. 14 shows a cross section through a guide tube of the gas spring according to FIG. 7.
Figure 15:
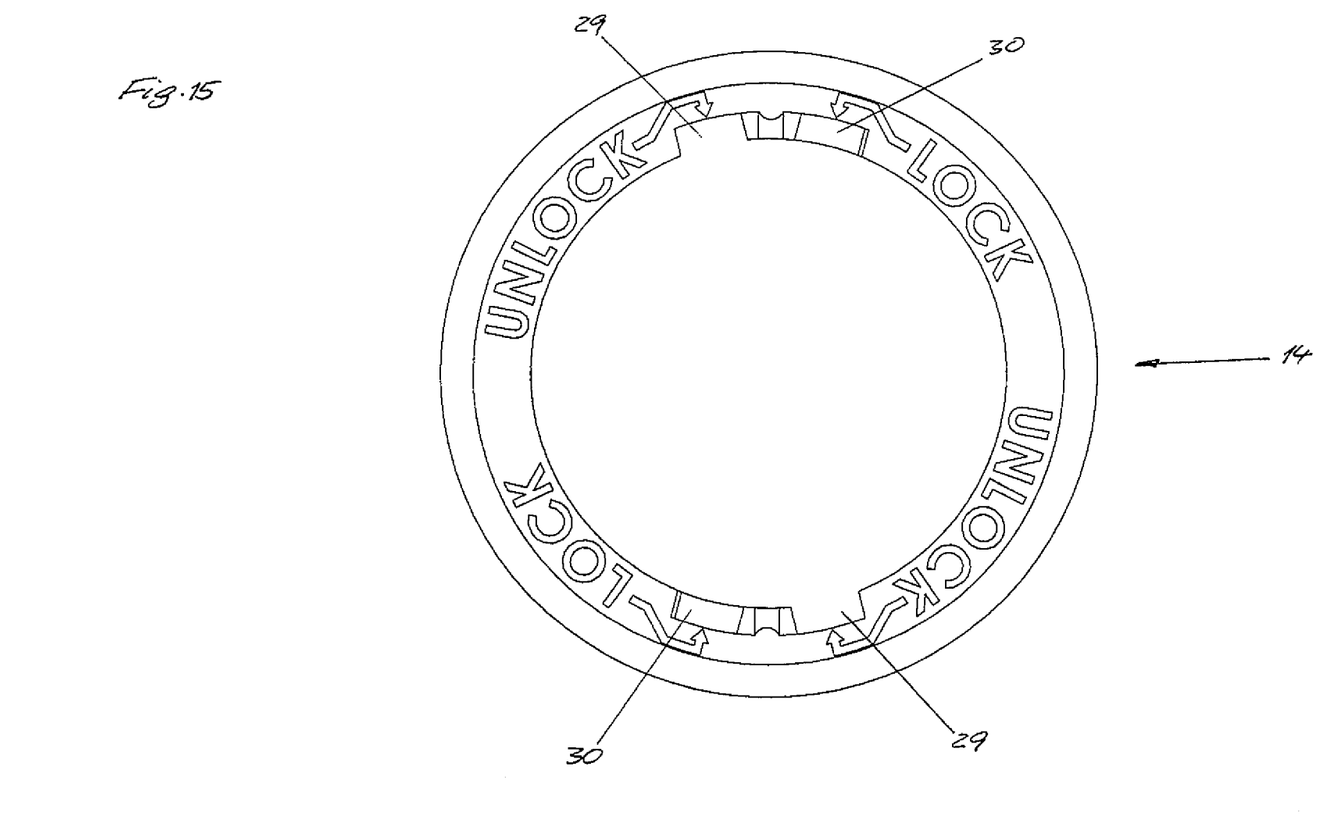
FIG. 15 is a front view of the guide tube according to FIG. 14.

Referring to FIG. 14, at the end of the rotation-blocking longitudinal groove 29 remote of the piston rod 3, a parallel longitudinal groove 30 of the same cross section is formed in the guide sleeve 14 parallel to the rotation-blocking longitudinal groove 29. The end of the parallel longitudinal groove 30 closer to the free end of the piston rod 3 opens into the rotation-blocking longitudinal groove 29 via a connection area 31 which is inclined in the manner of a ramp toward the rotation-blocking longitudinal groove 29. The parallel longitudinal groove 30 is also connected to the rotation-blocking longitudinal groove 29 at the end opposite to the connection area 31.

When the fastening tube 5 is rotated out of the releasing position into the locking position, the rotation-blocking projection 28 is moved out of the rotation-blocking longitudinal groove 29 into the parallel longitudinal groove 30 via the connection mentioned above. When the fastening tube 5 is rotated back, the rotation-blocking projection 28 returns to the rotation-blocking longitudinal groove 29 again.

However, when the piston rod 3 is pushed in out of the locking position, the rotation-blocking projection 28 moves into the parallel longitudinal groove 30 and into the rotation-blocking longitudinal groove 29 again via the connection area 31. In this way, a compulsory rotation of the fastening tube 5 is carried out relative to the cylinder arrangement 1 by which the counterstops 20 of the spring arms 25 catch in the longitudinal grooves 15 again.

When the guide projections 16 are located in the longitudinal grooves 15, they protect the spring arms 25 against transverse forces. The rotation-blocking projections 28 are either located in the rotation-blocking longitudinal grooves 29 or the guide projections 16 are located in the longitudinal grooves 15.

The invention is not limited by the embodiments described above which are presented as examples only but can be modified in various ways within the scope of protection defined by the appended patent claims.

I claim:

1. A lockable piston-cylinder unit comprising:
 a cylinder having a closed first end, a second end with a seal, and at least one axially facing counterstop;
 a piston axially movable in the cylinder, the piston dividing the cylinder into a first working chamber and a second working chamber;
 a piston rod connected to the piston and extending through the first working chamber and the seal, the piston rod having a free end outside the cylinder and being extendable by a stroke to a maximum extension; and
 a fastening tube having
  a closed first end to which the free end of the piston rod is fixed,
  an open second end which receives the cylinder coaxially,
  a length greater than the stroke, and
  at least one axially facing supporting stop that is axially fixed with respect to the length of the fastening tube,
 wherein, when the piston rod is extended to the maximum extension, the fastening tube is rotatable relative to the cylinder from a release position for adjustment, wherein said at least one axially fixed supporting stop is rotatably offset from a respective said at least one counterstop to a locking position, wherein the axially fixed supporting stop faces the counterstop so that the fastening tube cannot move axially relative to the cylinder.

2. The piston-cylinder unit of claim 1 wherein the fastening tube has a plurality of supporting stops and the cylinder has a plurality of counterstops.

3. The piston-cylinder unit of claim 2 wherein the supporting stops and the counterstops are uniformly distributed around the circumference of the fastening tube and the cylinder, respectively.

4. The piston-cylinder unit of claim 2 wherein at least one of the cylinder and the fastening tube has at least one stop which contacts at least one of the supporting stops and the counterstops in the locking position.

5. The piston-cylinder unit of claim 1 wherein the at least one counterstop projects radially outward from the cylinder, and the at least one supporting stop projects radially inward from the fastening tube.

6. The piston-cylinder unit of claim 1 further comprising means for blocking rotation of the fastening tube relative to the cylinder when the piston rod is not extended to the maximum extension.

7. The piston-cylinder unit of claim 6 wherein the means for blocking rotation comprises a rotation-blocking projection projecting radially inward from the fastening tube, and a longitudinal groove on the cylinder, the groove receiving the projection.

8. The piston-cylinder unit of claim 1 further comprising a holding sleeve fixed on the second end of the cylinder, the at least one counterstop being borne by the holding sleeve.

9. The piston cylinder unit of claim 8 wherein the holding sleeve and the at least one counterstop are formed as one piece.

10. The piston-cylinder unit of claim 8 wherein the fastening tube has an inner wall which displaceably guides the holding sleeve.

11. The piston-cylinder unit of claim 1 wherein the supporting stop has a stop plane extending circumferentially from an insertion end to a locking end, the locking end being farther from the first end of the cylinder than the insertion end.

12. The piston-cylinder unit of claim 1 wherein the counterstop has a stop plane extending circumferentially from an insertion end to a locking end, the locking end being closer to the first end of the cylinder than the insertion end.

13. The piston-cylinder unit of claim 1 further comprising a guide sleeve fixed in the second end of the fastening tube, the cylinder being displaceable in the guide sleeve.

14. The piston-cylinder unit of claim 13 wherein the guide sleeve has parallel first and second longitudinal grooves extending from the second end of the fastening tube, the second groove being joined to the first groove at a connection area which is ramped toward the first groove, the cylinder having a radial projection which moves from the first groove into the second groove as the fastening tube is rotated out of the release position into the locking position.

15. The piston-cylinder unit of claim 1 wherein the at least one counterstop can be deflected radially inward from a locking position to a run-over position to disengage a respective at least one said counterstop so that the cylinder can move axially relative to the fastening tube.

16. The piston-cylinder unit of claim 15 wherein each said supporting stop has a stop face formed as a ramp which is at an acute angle to the axis of the cylinder.

17. The piston-cylinder unit of claim 15 further comprising spring arms fixed to the second end of the cylinder, each spring arm having a free end at which a respective said counterstop is arranged.

18. A lockable piston-cylinder unit comprising:
a cylinder having a closed first end, a second end with a seal, and at least one axially facing counterstop;
a piston axially movable in the cylinder, the piston dividing the cylinder into a first working chamber and a second working chamber;
a piston rod connected to the piston and extending through the first working chamber and the seal, the piston rod having a free end outside the cylinder and being extendable by a stroke to a maximum extension;
a fastening tube having a closed first end to which the free end of the piston rod is fixed, an open second end which receives the cylinder coaxially, a length greater than the stroke, and at least one axially facing supporting stop,
wherein, when the piston rod is extended to the maximum extension, the fastening tube is rotatable relative to the cylinder from a release position for adjustment, wherein said at least one supporting stop is rotatably offset from a respective said at least one counterstop to a locking position, wherein the supporting stop faces the counterstop so that the fastening tube cannot move axially relative to the cylinder; and
means for blocking rotation of the fastening tube relative to the cylinder when the piston rod is not extended to the maximum extension,
wherein the means for blocking rotation comprises a guide projection projecting radially outward from the cylinder, and a first longitudinal groove inside the fastening tube, the projection being received in the first longitudinal groove.

19. The piston-cylinder unit 18 wherein the fastening tube has an inner wall with a plurality of first longitudinal grooves having respective ends, a plurality of counterstops forming guide projections received in the first longitudinal grooves, and a plurality of supporting stops being formed adjacent to respective said ends of the grooves.

20. A lockable piston-cylinder unit comprising:
a cylinder having a closed first end, a second end with a seal, and at least one axially facing counterstop;
a piston axially movable in the cylinder, the piston dividing the cylinder into a first working chamber and a second working chamber;
a piston rod connected to the piston and extending through the first working chamber and the seal, the piston rod having a free end outside the cylinder and being extendable by a stroke to a maximum extension;
a fastening tube having a closed first end to which the free end of the piston rod is fixed, an open second end which receives the cylinder coaxially, a length greater than the stroke, and at least one axially facing supporting stop,
wherein, when the piston rod is extended to the maximum extension, the fastening tube is rotatable relative to the cylinder from a release position for adjustment, wherein said at least one supporting stop is rotatably offset from a respective said at least one counterstop to a locking position, wherein the supporting stop faces the counterstop so that the fastening tube cannot move axially relative to the cylinder; and
means for blocking rotation of the fastening tube relative to the cylinder when the piston rod is not extended to the maximum extension,
wherein the at least one counterstop is deflectable radially inward from a locking position to a run-over position to disengage a respective at least one said counterstop so that the cylinder can move axially relative to the fastening tube,
wherein each said counterstop has a stop face formed as a ramp which is at an acute angle to the axis of the cylinder.

* * * * *